Aug. 10, 1954 — R. DAUB — 2,685,729
METHOD OF MAKING COMPOSITE PISTON STRUCTURES
Filed May 10, 1951 — 2 Sheets-Sheet 1
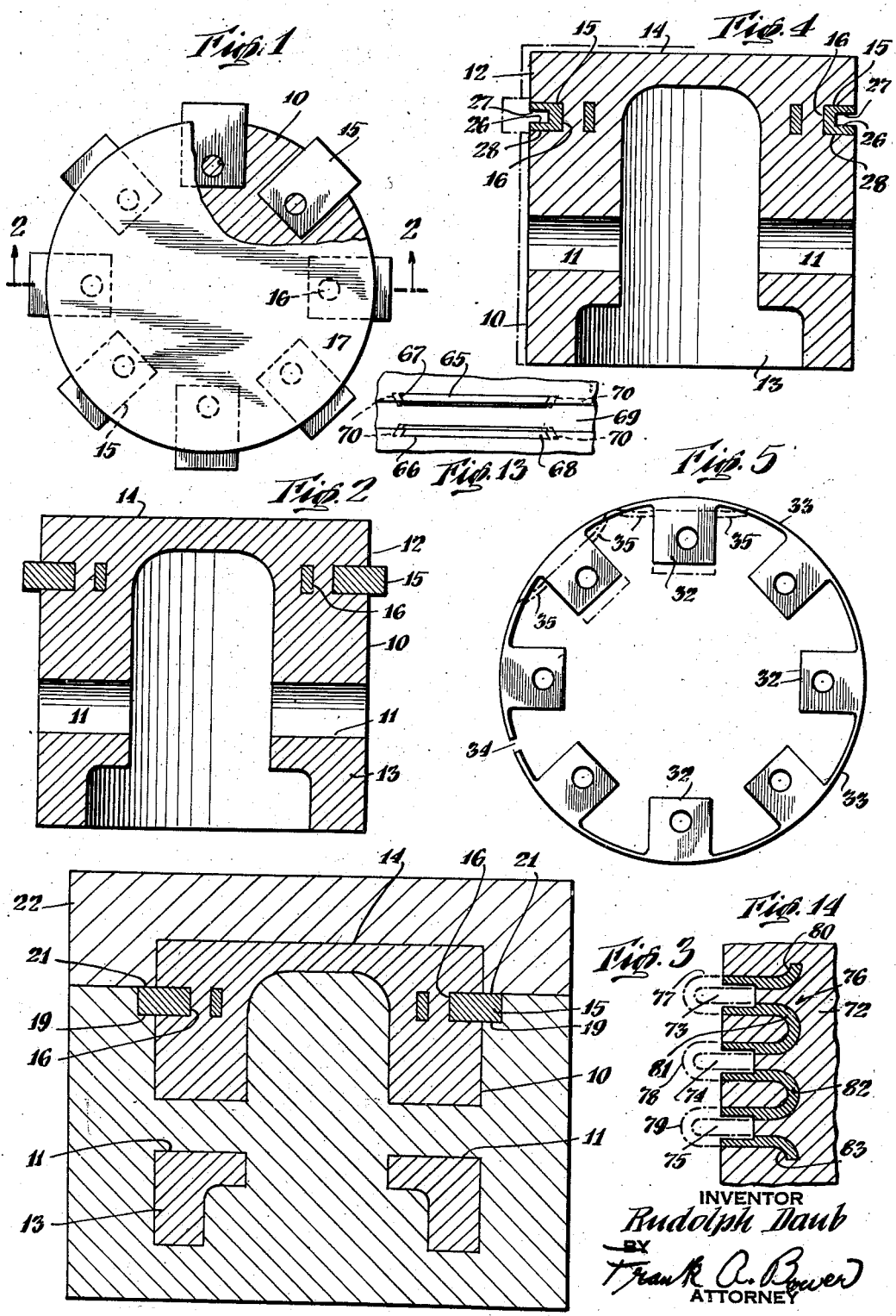
INVENTOR
Rudolph Daub
BY Frank A. Bower
ATTORNEY Aug. 10, 1954   R. DAUB   2,685,729
METHOD OF MAKING COMPOSITE PISTON STRUCTURES
Filed May 10, 1951   2 Sheets-Sheet 2
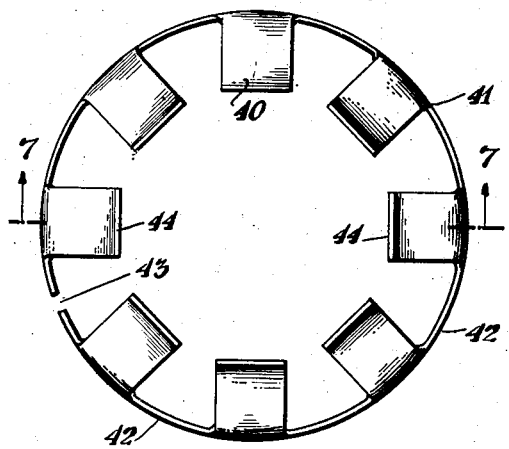
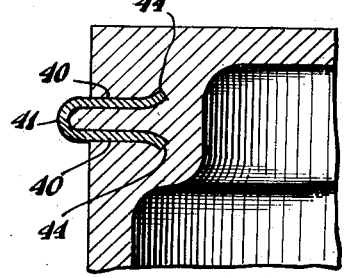
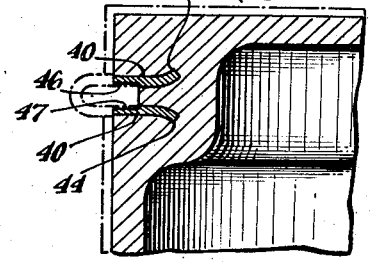
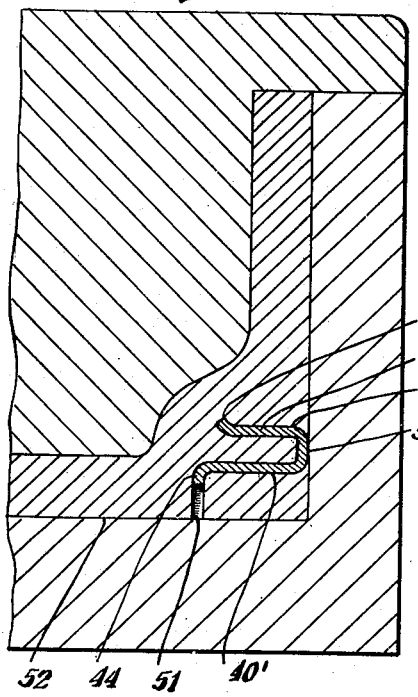
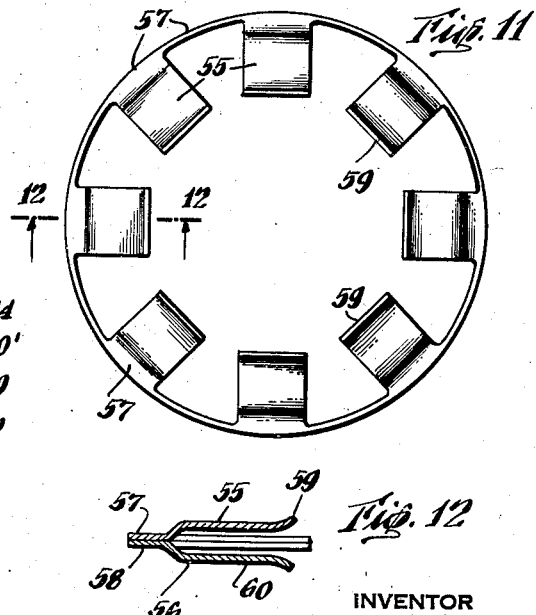
INVENTOR
Rudolph Daub
BY Frank A. Bower
ATTORNEY Patented Aug. 10, 1954

2,685,729

UNITED STATES PATENT OFFICE 2,685,729

METHOD OF MAKING COMPOSITE PISTON STRUCTURES

Rudolph Daub, West Caldwell, N. J., assignor of twenty per cent to Frank A. Bower, New York, N. Y.

Application May 10, 1951, Serial No. 225,533

5 Claims. (Cl. 29—156.5)

This invention relates to piston structures and particularly to pistons for internal combustion engines.

The object of the invention is to provide a piston combining lightness and durability in service.

In light metal pistons the ring grooves and particularly the first groove at the piston head has a relatively short life due to the softness of the metal at the high temperatures encountered. Attempts to overcome this objection have involved composite structures, expensive and often complicated, and attended with their own additional difficulties such as the bonding of dissimilar metals under very severe stresses and extreme variations in temperature.

In the present piston structure these objections are overcome by combining with the groove structures of light metal facings of harder metal spaced apart around the groove and anchored in the light metal of the piston so as to present the hard metal for contact with the piston ring and individually distribute the resulting stresses throughout the soft to hard metal anchorages.

The hard metal inserts thus float in the soft metal and follow the expansion and contraction of the piston metal without developing substantial stresses between them and merely transmit and distribute the ring pressures to relatively large areas of the softer metal so as to reduce the intensity of the strains while taking up the wear of the ring action and protecting the softer metal of the groove.

Further objects of the invention, particularly in the provision of continuous paths for heat dissipation through the relatively conductive soft metal to cool the piston crown, will appear from the following specification taken in connection with the accompanying drawings in which Fig. 1 is a cross section of an unmachined piston casting taken along the line 1—1 of Fig. 2;

Fig. 2 is an end view of the casting of Fig. 1 taken along the line 2—2 thereof;

Fig. 3 is a sectional view of the piston of Figs. 1 and 2 while still in the mold;

Fig. 4 is a cross sectional view of the piston of Figs. 1, 2 and 3 machined and showing one groove for the accommodation of a sealing ring;

Fig. 5 is a modified form of a detail of the piston manufacture showing a series of sector pieces connected together in circular formation;

Fig. 6 is a plan view of a further modification;

Fig. 7 is a sectional view taken along line 7—7 of Fig. 6;

Figs. 8 and 9 are sectional views of details of the piston using the modified insert of Figs. 6 and 7;

Fig. 10 is a partial view of the molding of a modified form of re-enforcing insert;

Fig. 11 is a plan view of a further modified form of piston insert;

Fig. 12 is a sectional view taken on the line 12—12 of Fig. 11;

Fig. 13 is a face view of a modified hard metal insert in the piston body; and

Fig. 14 is a radial sectional view of a detail illustrating a modified form of annular insert.

In the embodiment of the invention shown in Figs. 1 to 4 hard metal inserts 15 formed as cast steel sectors are imbedded in the piston body 10 at the ring carrying zone 12. The piston has the skirt 13 and crown 14 and is of relatively soft metal such as aluminum alloy in common use.

The sectors 15 are cast in place as illustrated in Fig. 3, being set in place on shoulder 19 of the mold 20 and held by ledge 21 of the mold top 22 for pouring of the molten aluminum, as shown, filling in the cavity parts to seize and hold the sectors 15 which may have orifices 16 receiving the molten metal and adding to the security of the anchorage of the sectors in the piston body. The steel sectors 15 are not pinched by the two mold halves but, on the contrary, have a slight axial clearance so that the piston metal after being cast and during its chilling and shrinking period can pull the sectors along toward the axis. Conversely, during heating of the piston from cool condition the sectors drift with the growth of the piston diameter without any strain on the bond between the body and the sectors. The resultant raw piston is illustrated in Figs. 1 and 2, it being understood that any desired structure of the cast light metal may be used for the crown and skirt, the skirt wall 13 being preferably thinner between the wristpin bearings 11, as shown, for instance, in Fig. 10.

The cast piston structure is now machined to size (Fig. 4), the protruding ends of the sectors 15, used to position the sectors in the mold (Fig. 3), being cut down to substantially the peripheral diameter of the piston, the piston and sectors being grooved at 26 with the required dimensions for the piston ring (not shown). Only a single grooved structure is shown but a number may be formed in the same piston or the additional grooves may be conventionally formed in the soft metal below the first groove structure shown which being near the crown edge and combustion chamber will have the severest service. The groove 26 is shown cut substantially at the center of the ring and provides top, bottom and inner steel surfaces which are much better adapted to resist wear due to pounding by an iron ring. While the steel armored areas of the groove lands 27, 28 comprise about 50% of the total groove land area, this ratio can be varied by altering the number and shape of the steel sectors. In all cases, however, a direct path will be provided in the aluminum between the piston crown 14 and the wristpin bosses for transmitting explosion and inertia forces. This means that the steel sectors 15 are correspondingly relieved of these stresses and do not have to carry these alternating loads in any substantial degree. Therefore, neither thermal stresses due to different expansion co-efficients nor mechanical stresses in operation will overstrain the bond between the steel sectors and the surrounding aluminum body.

The steel sectors 15 are preferably made of strip steel and can be fabricated cheaply by punch presses and quickly dropped into place in the mold by a guiding jig or template and held there by gluey facing films or temporary retaining ring sectors overlying the protruding ends above the shoulder. An alternative system is illustrated in Fig. 5 in which the sectors 32 are connected by thin flexible strips 33 with an open gap 34 and sufficiently flexible to permit the sectors to move inward toward the center of the piston during cooling of the molten aluminum, the strip bending, as indicated in broken lines 35, or even breaking. During the subsequent machining operations the strip 33 will be removed with the finished pistons and ring groove showing the same configuration as indicated in Fig. 4. Preferably the gap 34 will be provided and the over-all dimension of the strip assembly may be such that it will fit snugly and under radial pressure into the mold in the manner of a sealing ring fitting a cylinder core (Fig. 10), thereby assuring a firm hold in the mold.

Instead of solid sectors 15 the reinforcing pieces may be provided (Figs. 6–9) as inward bent sections 40 of a sheet or plate metal strip 41 cut in flat form to provide the connecting strip portions 42 and then rolled to the desired diameter leaving gap 43. The sectors 40 have their inner ends 44 curved apart as shown and the ring is positioned in the mold to be cast with its peripheral strip portion 41 protruding, as shown in Fig. 8, so that the subsequent machining shown in broken lines (Fig. 9) will remove it and provide the surfaces 46, 47 of the ring groove while enclosing the ends 44 in the piston head.

In the modification shown in Fig. 10 a bent ring 49 of the type shown in Figs. 6–9 is sized to fit its outside diameter 50 within the mold which casts the piston metal with the crown at the bottom. Three of the sectors 40' have lugs or tongues 51 with their ends resting on the bottom 52 of the mold and positioning the ring as shown. After casting the piston is machined to cut away the peripheral portions of the ring and provide grooving as illustrated in Fig. 9. The piston crown may be bored to a slight depth at each tongue 51 and plugged and smooth-surfaced to obliterate the markings. Another construction of a sheet or plate metal ring is illustrated in Figs. 11 and 12 made of two similar pieces 55, 56 fitted together at their peripheral rim portions 57, 58 and positioned together in the mold and cast and machined as described in connection with Figs. 6–9, giving a final structure corresponding to that shown in Fig. 9 with the sectors 59, 60 forming inserts in the opposite faces of the groove.

In Fig. 13 the hard metal inserts 65, 66 are illustrated with their edges 67, 68 cut at angles spreading to greater width within the seat in the metal on each side of the groove 69 so that they are retained against axial movement. Similarly these inserts are slightly tapered to less width at their outer ends from an intermediate point 70 so as to be retained against radial outward movement.

In the modification shown in Fig. 14, the piston body 72 has a plurality of ring grooves, for instance, 73, 74 and 75 and the hard metal inserts are provided in a single assembly 76 forming annular rings 77, 78 and 79 carrying the four re-inforcing pieces 80, 81, 82 and 83 extending inward as shown in Figs. 6 and 12, the outer portions being later cut away as indicated in broken lines to leave the inserts providing the grooved surfaces engaged by the rings.

The piston structure of this invention is inexpensive in manufacture and material and durable in service. It is light and strong and efficiently heat-dissipating to avoid excessive temperature rise and in particular to carry the heat away from the periphery of the piston near the crown. It thus avoids failure at the very most vulnerable area by presenting hard wearing surfaces in contact with the sealing ring and maintaining the continuity of the body metal structure between crown and wristpin bearings and at the same time providing uninterrupted paths for the flow of heat from the crown to the skirt.

All of these features contribute to the preservation of the bond between the sectors and the light metal body to render the structure permanently integral and insure proper fitting of the sealing ring throughout a long period of service.

I claim:

1. A method of forming a composite piston structure comprising providing a one-piece, integral metal strip having spaced sections removed to leave a circular series of metal inserts lying in the same plane and joined together at their outer portions by a circular ring forming part of said integral one-piece strip, supporting said strip in a mold, casting a lighter metal to form the body of the piston around said inserts lying substantially in the same plane normal to the axis and with said circular ring outside of the final piston body, machining said piston body and a portion of said inserts to remove said ring and leave said inserts separately imbedded in the periphery of the piston body and lying in a plane normal to the axis of the piston, and forming a ring groove around the periphery thereof with surfaces of said inserts exposed at separated areas in sequence around said groove and with the light metal of the body intervening between said inserts.

2. A method of forming a composite piston structure as set forth in claim 1 in which the inserts have radially protruding portions seated in the mold.

3. A method of forming a composite piston structure as set forth in claim 1 in which the ring integral with said inserts extends peripherally around the outer ends thereof.

4. A method of forming a composite piston structure as set forth in claim 3 in which the peripheral ring is split and flexible.

5. A method of forming a composite piston structure as set forth in claim 1 in which the inserts have portions providing axially extending surfaces anchoring said inserts against radial movement in the metal of the piston.

References Cited in the file of this patent

UNITED STATES PATENTS

| Number | Name | Date |
|---|---|---|
| 1,777,369 | Jacobs | Oct. 7, 1930 |
| 1,781,207 | Wysong | Nov. 11, 1930 |
| 1,790,230 | Deputy | Jan. 27, 1931 |
| 1,830,519 | McCoy | Nov. 3, 1931 |
| 1,978,045 | Flower | Oct. 23, 1934 |
| 2,278,958 | White et al. | Apr. 7, 1942 |
| 2,550,879 | Stevens, Jr. | May 1, 1951 |
| 2,578,021 | Sandberg | Dec. 11, 1951 |

FOREIGN PATENTS

| Number | Country | Date |
|---|---|---|
| 611,383 | Germany | Apr. 5, 1935 |
| 619,877 | Germany | Oct. 9, 1935 |
| 897,373 | France | Mar. 20, 1945 |